Figure 1:
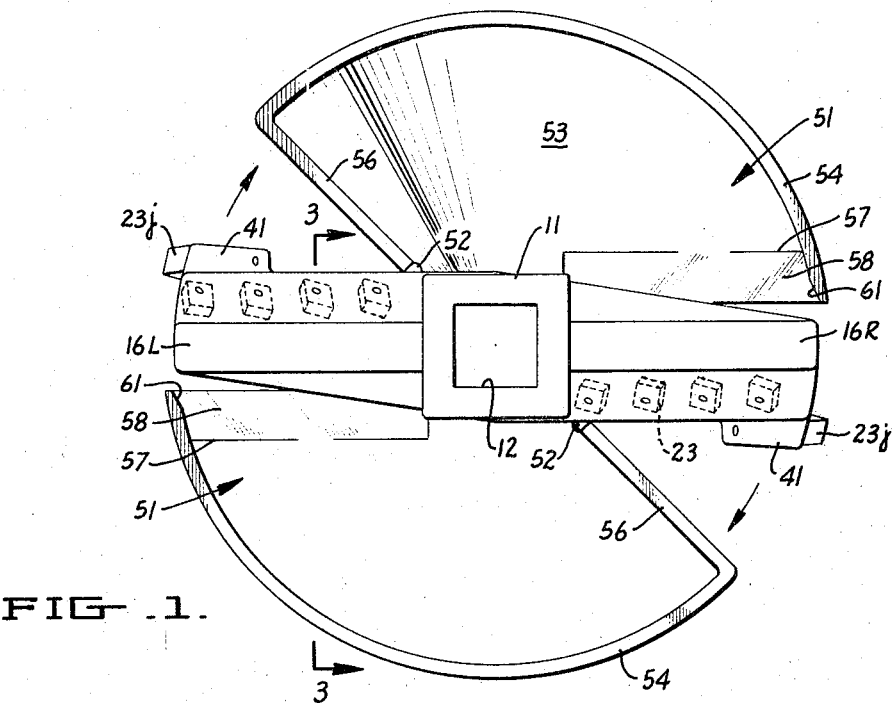

April 4, 1967 G. A. PETERSEN 3,312,297
EARTH AUGER HEAD HAVING FINGER TIP TEETH
Filed Sept. 21, 1964 2 Sheets-Sheet 1

INVENTOR.
GERALD A. PETERSEN
BY *Julian Caplan*
ATTORNEY

April 4, 1967 G. A. PETERSEN 3,312,297
EARTH AUGER HEAD HAVING FINGER TIP TEETH
Filed Sept. 21, 1964 2 Sheets-Sheet 2
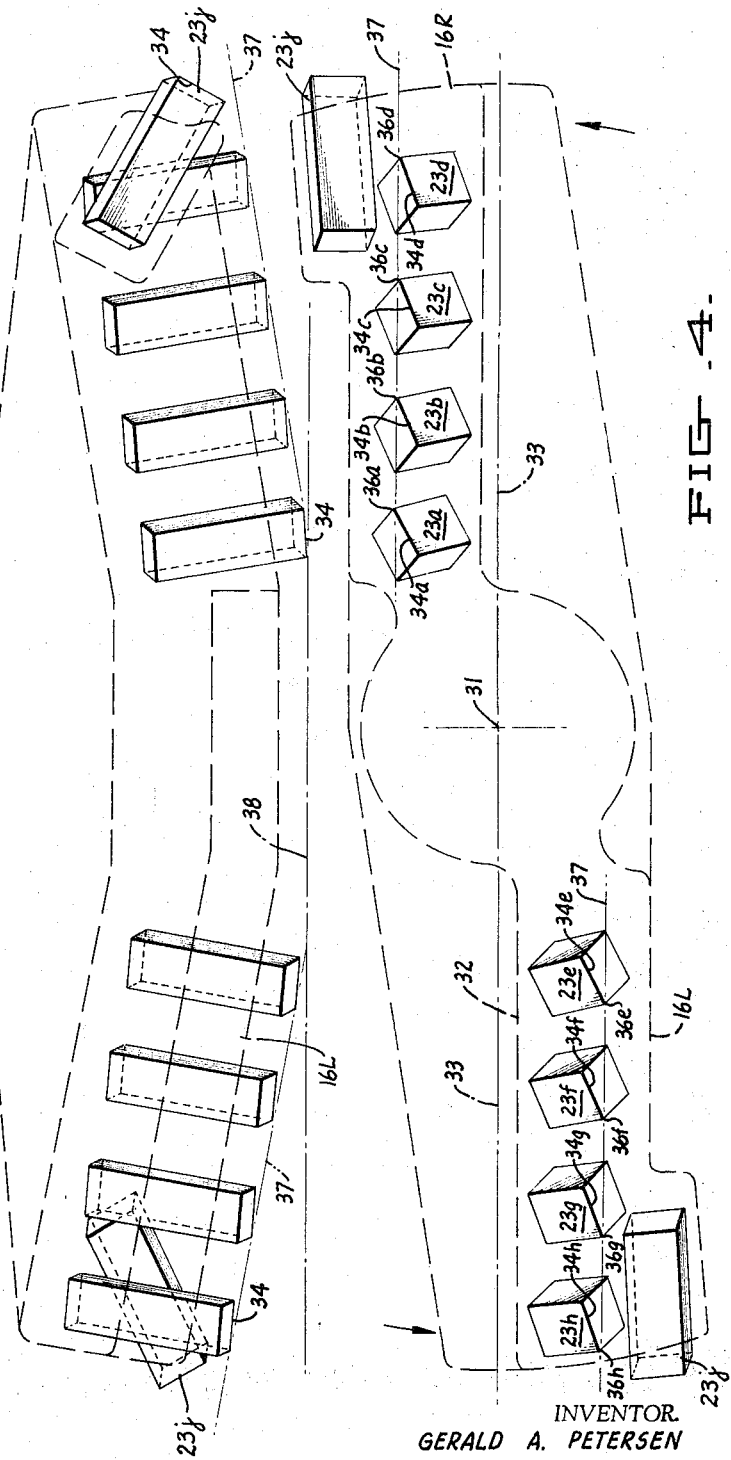
INVENTOR.
GERALD A. PETERSEN
BY Julian Caplan
ATTORNEY 3,312,297
EARTH AUGER HEAD HAVING
FINGER TIP TEETH
Gerald A. Petersen, Sunnyvale, Calif., assignor of
one-half to Anita E. Petersen, Saratoga, Calif.
Filed Sept. 21, 1964, Ser. No. 397,754
8 Claims. (Cl. 175—392)

This invention relates to a new and improved earth auger head having finger tip teeth Earth augers of the type used to dig utility pole holes, tower footings, post holes, and the like, are provided with heads having arms projecting out from the central axis of the head carrying a plurality of cutting teeth. Such teeth are replaceable and absorb the principal wear of the digging action, whereas the head is a permanent part of the auger. Generally, a screw auger flight is installed above the head to convey away the earth cut by the teeth. The present invention relates to a new and improved tooth for installation in such heads, as well as to the combination of head and tooth.

A further feature of the invention is the provision of a flight or pan for each arm of the head installed immediately behind the arm in the normal direction of rotation of the auger. The pan has a ramp which scoops up the earth cut by the teeth and elevates the same into the screw flight or, if no screw flight is used, holds the earth above the bottom of the hole being dug and thus prevents the teeth from being clogged by earth already dug. The use of such a pan in connection with present invention is particularly important in that the teeth, hereinafter described in detail, are primarily for use on hard or rocky ground and their action on such ground is to form powdery chips which are difficult to convey away by other means.

One of the principal features of the invention is the use of a plurality of removable cutting teeth which are held in sockets in the arm of the auger head. The sockets are so positioned and relatively spaced that the teeth held therein are oriented for effective cutting. In addition, there are two sockets on the outer ends of each arm to hold side-cutting teeth, the side-cutting teeth being of a configuration similar to the other teeth previously mentioned.

A still further feature of the invention is the fact that the cutting teeth are formed of tool steel bar stock, preferably of rhomboid cross-section. Thus, pieces of tool steel may be cut from bar stock to form right prisms and the pieces may be used as cutting teeth without other fabrication. Such teeth are to be contrasted with other excavating tool teeth which are extremely complicated in their shape and are expensive and difficult to fabricate.

Another advantage of the invention is the fact that each of the teeth may be removed from its respective socket when its cutting edge is dulled. Further, each tooth may be removed, turned 180° and replaced in its socket to present a second cutting edge when the first edge is dulled. By turning the tooth end-to-end, two additional cutting edges are presented. When both ends of the tooth have been dulled, the tooth may be ground to renew the cutting edges. Inasmuch as the cutting edges of the tooth absorb substantially all of the wear of the cutting action, and since the cutting edges are readily renewable as heretofore described, the auger head may be kept sharp with a minimum of labor and effort indefinitely, and the life of the body of the head in which the teeth are received is, for practical purposes, permanent.

Another feature of the invention is the provision of convenient means to hold each tooth in its socket. Thus, one wall of each socket is apertured and grooved and a piece of rubber or other resilient material is inserted in the hole in the wall of the socket to serve as a key so that when the inner end of the tooth is jammed down into the socket, the rubber is compressed between the wall of the socket and the side of the tooth thereby frictionally retarding withdrawal of the tooth from the socket. When it is necessary to remove the tooth, it may be pulled out of the socket against the frictional restraint of the rubber, or provision may be made to knock the tooth out of its socket from its inner end.

Still another feature of the invention is the fact that each socket is so oriented in the head arm that the exposed end of the tooth is slanted rearwardly relative to the direction of rotation of the auger and thus the cutting edge of the tooth is lowermost. This arrangement of each tooth relative to the arm provides "negative rake" so that there is no interference of rearward surfaces of the tooth with cutting action of the cutting edge. Location of the tooth at such angle provides automatically for rake, even when the end of the tooth is at right angles to the tooth side so that the tooth need not be specially ground to provide such rake.

An additional important feature of the invention is the manner in which the teeth are located relative to each other. Thus, the teeth are substantially balanced diametrically on opposite sides of the central axis of rotation of the head. Such balancing resists any tendency of the head to deviate from a straight line of digging and further reduces any tendency of the head to wobble out of alignment.

A still further feature of the location of the teeth is the fact that certain of the teeth are staggered outwardly at different distances from the central axis of rotation so that their annular paths overlap. Thus, the annular path of the innermost tooth of one arm has its inner margins slightly closer to the central axis of rotation than the outermost edge of the innermost tooth of the other arm. This arrangement of staggered teeth assures that at least one tooth traverses every portion of the cross-sectional area of the hole being dug by the head.

Another feature of the invention is the fact that the teeth are staggered in elevation. The two innermost or center teeth are at the same elevation, but the next outermost tooth in each arm is at an increasingly higher elevation. This staggered elevation of the teeth insures that the hole dug by the bit is cone shaped with the apex of the cone downward. Such a conical shape of the hole is extremely effective since it helps to prevent deviation from a straight line and wobbling.

A still further feature of the invention is the variation in angle between the cutting edge of the tooth and the leading edge of the arm in which it is located. Such angle decreases with each tooth proceeding outwardly from the central axis.

Figure 2:
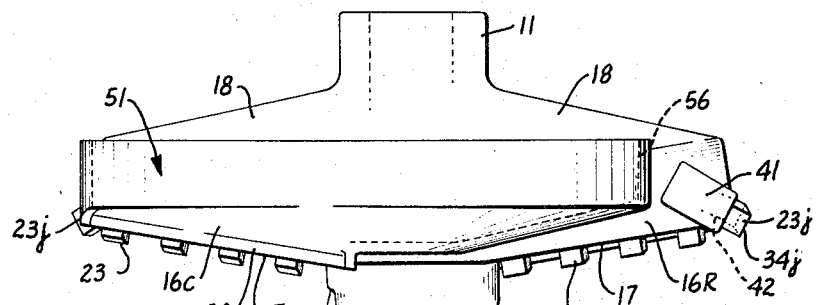
Figure 3:
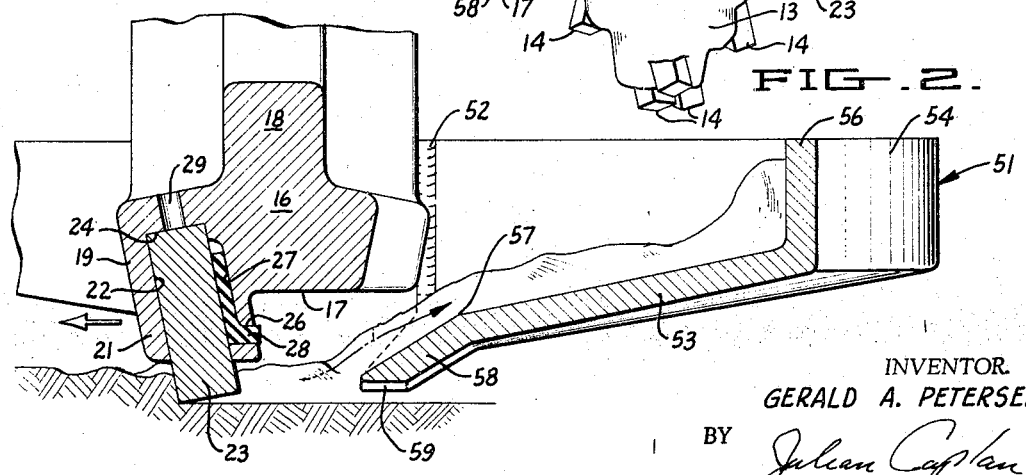

Other objects of the present invention will become apparent upon reading the following specification and referring to the accompanying drawings in which similar characters of reference represent corresponding parts in each of the several views:

In the drawings:
FIG. 1 is a top plan view of an auger head in accordance with this invention.
FIG. 2 is a side elevation thereof.
FIG. 3 is an enlarged fragmentary sectional view taken substantially along the line 3—3 of FIG. 1.
FIG. 4 is a schematic bottom plan view showing the geometry of the location of the teeth; and
FIG. 4A is a side elevational view thereof.
FIG. 5 is an end elevational of a tooth; and
FIG. 6 is a side elevation thereof.

The auger which is the subject of the present invention is provided with a hub 11 shown here, having a square configuration and formed with a square hole 12 to be attached to the shaft of the auger, preferably immediately below the screw flight thereof. It will be understood that hub 11 is subject to considerable variation depending upon the type of auger shaft with which the invention is used. Below the auger head hereinafter described in detail, there may be located a pilot bit 13. A particular pilot bit herein illustrated is formed with sockets for a plurality of teeth 14, as is more clearly illustrated and described in co-pending patent application Ser. No. 341,588, filed Jan. 31, 1964, for Finger-Type Pilot Bit, now Patent No. 3,280,927. It will be understood that other forms of pilot bits may be substituted for that here illustrated, or a pilot bit may even be omitted in some circumstances. Projecting outwardly from the lower end of hub 11 are arms 16L, 16R which, together with the adjacent hub structure, make up an auger head in accordance with this invention. The bottom edge 17 of each arm 16 slants upwardly outwardly at an angle of about 10° with respect to the horizontal. The upper edge of each arm is reinforced with a gusset 18 which connects adjacent the upper end of hub 11. The forward edge 19 of each arm slants upwardly rearwardly at an angle of approximately 11°. Depending below bottom surface 17 on the leading edge of each arm is a rim 21 which is generally rectangular in cross-section. Fitting into the bottom of rim 21, and extending up part way into arm 16, is a plurality of sockets 22, each shaped to receive a portion of tooth 23.

Tooth 23, as best shown in FIGS. 5 and 6, is a right prism having a rhomboid cross-section with the acute angle of the rhomboid being about 60°. Tooth 23 is preferably made of tool steel cut from bar stock. Each tooth has two cutting edges 34 at each end and each cutting edge has an effective width of about ¾-inch. It will be seen that when one cutting edge 34 of the tooth is worn, it may be turned at 180° in its socket 22, whereupon an identical new cutting edge is presented. It will further be seen that when both edges of one end are worn, the tooth may be reversed whereupon two additional cutting edges are presented. The length of tooth 23 is about two inches and socket 22 in which it is received has a depth considerably less than two inches so that when both ends of the tooth are worn the tooth may be ground and reused until the tooth becomes so short that it no longer functions, whereupon it may conveniently be replaced.

Socket 22 is shaped to receive the tooth 23 and its inner end 24 is at a depth such that the lower end of the tooth projects from the bottom of the socket. A preferred means of holding tooth 23 in socket 22 is best illustrated in FIG. 3. A hole 26 is formed in one of the walls of rim 21 and the wall of socket 22 inwardly of hole 26 is formed with a longitudinal groove 27. A key 28 of rubber or other resilient material formed of circular cross-section is slipped into the hole 26 extending into the socket 22. When the tooth 23 is jammed into socket 22, key 28 is compressed between the side of the tooth and the bottom of groove 27, thereby frictionally holding the tooth in place against unintentional dislodgment. When it is necessary to replace the tooth it may be gripped by a pincer-like instrument at its lower end and pulled against the frictional resistance of key 28. Alternatively, a hole 29 may be formed in the upper end of arm 16 and an instrument inserted to contact the inner end of the tooth and to drive the same out of the socket.

The location of the cutting edges of tooth 23 relative to axis 31 of the auger is best shown in FIGS. 4 and 4A. In the first place, it will be noted that the trailing edge 32 of each arm 16 is displaced forwardly relative to a reference diameter 33 through axis 31, but that said edge is parallel to such diameter. The cutting edge 34 of each tooth 23 has its inner corner 36 lying on reference line 37 parallel to said diameter 33. Corner 36 is sometimes referred to herein as the "reference corner." The angle which each cutting edge 34 makes with line 37 varies from tooth to tooth. Furthermore, the radial distance of corner 36 from axis 31 likewise varies. Finally, the elevation of each corner 36 above a horizontal reference plane 38 in FIG. 4A varies. For purpose of illustration of the foregoing variations, the four teeth on the right-hand side of FIGS. 4 and 4A have been numbered 23a to 23d, respectively, proceeding from the center outwardly to the periphery of the head, and the four teeth on the left-hand side of FIGS. 4 and 4A have been numbered 23e to 23h, inclusive, proceeding outwardly from the center toward the periphery. Corners 36 and cutting edges 34 have been provided with subscripts corresponding to the letters on the teeth themselves.

In a typical auger head having approximately 20" diameter of cut, reference corner 36a is spaced outwardly from axis 31a radial distance of 2⅝", corner 26b is spaced outwardly an additional 1¾", and the same increment applies with respect to corners 36c and 36d. On the opposite side of the head, corner 36e is spaced outwardly from axis 31 a distance of 3½". In other words, corner 36e is spaced from axis 31 half the distance between corners 36a and 36b. Similarly, corners 36f, 36g, and 36h are spaced outwardly from corner 36e in increments of 1¾".

The angle which cutting edge 34a makes with respect to reference line 33 is about 28°, whereas the angles between cutting edges 34b, 34c and 34d with respect to said line 37 are 25°, 22° and 20°, respectively. On the other side of the head, the angle between cutting edge 34e and reference line 37 is 27°, or slightly less than the angle between edge 34a and line 37, and similarly the angles between edges 34f, 34g and 34h are 24°, 21° and 19°, respectively.

The elevation of the corners 36a to 36d, inclusive, with respect to reference plane 38 increases in equal increments by reason of the fact that reference line 37 is at an angle with respect to base line 38 of 10°. A similar relationship exists with respect to corners 36e to 36h, inclusive, on the opposite side of the head.

The foregoing arrangement provides staggered teeth, both in radial distance from the central axis of rotation of the auger head and in elevation. The staggering of the teeth in radial distance from the axis insures an overlapping cut wherein the teeth on the left-hand side cut the ridges between the furrows cut by the right-hand side teeth, and thus substantially the entire cross-section of the hole being dug is traversed by one of the teeth of the auger with only a slight gap between adjacent furrows, which gap can be disregarded for practical purposes. At the same time, the staggering of the teeth from side to side balances the work done by each arm and resists the tendency of the auger to wobble or to slant out of the desired angle of cutting. The staggering of the teeth in elevation insures a conical bottom to the hole being dug, which is particularly desirable to insure that the hole will retain its true direction.

The variation in angle of the cutting edge 34 with respect to a line 37 drawn parallel to the diameter insures that each cutting edge cuts into the soil in a direction approximately parallel to the axis of the tooth.

The negative rake of each tooth, which has previously been emphasized, is achieved by tilting each socket 22 and tooth 23 backward (relative to the direction of rotation of the auger) at an angle of 11°. This locates cutting edge 34 lowermost and prevents rearward surfaces of the tooth from interfering with rotation.

The outer rearward end of each arm is provided with a boss 41 and is formed with a socket 42 to receive side cutting tooth 23j. Teeth 23j maintain a clean cylindrical hole dug by the auger. Tooth 23j is similar to teeth 23a to 23h in shape and held in socket 42 by similar means. The cutting edge 34j of tooth 23j projects outward beyond the perimeter of arm 16 and the two teeth 23j on opposite sides are equidistant from the central axis 31. The angle which the axis of socket 42 assumes with respect to the horizontal is about 30°. Negative rake is provided by slanting the socket backward at an angle of about 11°.

Teeth 23 are most effective in very hard ground and their action is to produce powdery or at least finely divided "chips" which might tend to clog the hole being dug if not conveyed away. Accordingly, each arm 16 is provided with a pan 51 immediately behind the arm in the normal direction of rotation thereof and is welded to the opposite arm as indicated by reference numeral 52. Pan 51 has a floor 53 which viewed in plan, is annular with an outside radius about equal to that of the hole being dug (i.e., the radial distance of the cutting edge of side cutting tooth 23j) and is a sector with an arcuate width of about 135°. Floor 53 slants outwardly-upwardly at about a 5° angle. The outside of floor 53 is provided with a shallow upstanding peripheral rim 54 which curves around and extends in a radial inward stretch 56 at the trailing edge of pan 51. Stretch 56 at its inner end contacts the opposite arm 16 where it is welded thereto. The leading edge 57 of pan 51 is stepped back from the arm 16 with which it is associated so that it does not interfere with tooth action. Floor 53 is about at the level of the bottom of arm rim 21. However, the leading edge of floor 53 is formed with a downward-forward slanted ramp 58, the lower edge of which is about at the working level of the cutting edges of the teeth. The bottom corner 59 of ramp 58 is beveled to afford clearance. Similarly, the front edge 61 of rim 54 is beveled outwardly.

The soil is cut by the teeth and is scooped up by ramp 58 and raised onto floor 53, being prevented from falling over the edge by rim 54. If a flight auger (not shown) is located above the head the soil is conveyed away from the trailing edge 56 of the pan by such auger. If no flight auger is used, the pan itself holds the cut soil back from interfering with the cutting action of the teeth in the bottom of the hole.

Although the foregoing invention has been described in some detail, by way of illustration and example for purposes of clarity of understanding, it is understood that certain changes and modifications may be practiced within the spirit of the invention and scope of the appended claims.

What is claimed is:

1. An auger head having at least one outward projecting arm formed with a plurality of sockets spaced apart along said arm, a tooth in each said socket complementary to said socket, and means for removably holding each said tooth in its respective socket, each said tooth comprising a short section of hard material bar stock partially projecting from said arm, each said tooth being a right prism of rhomboid shape in cross-section, each said socket being parallel and slanted upwardly-rearwardly relative to the normal direction of rotation of said head, whereby one side edge of the exposed end of each said tooth is the cutting edge in said normal direction of rotation, said cutting edge being lowermost in drilling position.

2. A head according to claim 1, in which the angle at which said socket slants in about 11°.

3. A head according to claim 1, in which the angle between a radial line and the cutting edge of each successive tooth decreases outwardly.

4. A head according to claim 1, in which said means comprises a short section of resilient material partially in a hole formed in said arm extending into said socket, said section compressed between said tooth and a wall of said socket.

5. A head according to claim 1, which further comprises a side-cutting tooth at the outer end of said arm directed outwardly and slightly downwardly, said arm formed with a second socket for said side cutting tooth, said side cutting tooth being substantially the same in shape as said first-mentioned teeth.

6. A head according to claim 1, which further comprises a pan, said pan being sector-shaped in plan with its outer edge at a radius about that of said arm, said pan having its leading edge immediately rearward of said arm and at about the elevation of said arm, said leading edge formed with an upward slanting ramp to scoop up dirt cut by said teeth.

7. A head according to claim 6, in which said pan has a floor slanting upwardly-outwardly with a peripheral upstanding rim, said rim extending inward on the trailing edge of said pan.

8. A head according to claim 1, which further comprises a pilot bit below the center of said head and of substantially lesser diameter than said head, said pilot bit comprising a body formed with a plurality of second sockets, a tooth in each said second socket complementary to said second socket, pilot bit teeth in said second sockets similar to said first mentioned teeth, and means for removably holding said pilot bit teeth in their respective second sockets similar to said first mentioned means.

References Cited by the Examiner

UNITED STATES PATENTS

| | | | |
|---|---|---|---|
| 1,387,417 | 8/1921 | Lennon | 299—91 X |
| 2,111,785 | 3/1938 | Kittrell | 175—392 |
| 2,800,302 | 7/1957 | McClennan | 175—391 |
| 2,864,601 | 12/1958 | McCarthy | 175—391 X |
| 2,879,035 | 3/1959 | Tilden | 175—410 X |
| 2,968,880 | 1/1961 | Petersen | 37—142 |
| 3,198,266 | 8/1965 | Mishler | 175—385 X |

CHARLES E. O'CONNELL, *Primary Examiner.*

N. C. BYERS, *Assistant Examiner.*